(12) United States Patent
Chiu

(10) Patent No.: US 8,398,883 B2
(45) Date of Patent: Mar. 19, 2013

(54) ELECTROCHEMICAL COMPOSITION AND ASSOCIATED TECHNOLOGY

(75) Inventor: Ko-Yu Chiu, Taoyuan County (TW)

(73) Assignee: Advanced Lithium Electrochemistry Co., Ltd., Taoyuan County (TW)

( * ) Notice: Subject to any disclaimer, the term of this patent is extended or adjusted under 35 U.S.C. 154(b) by 164 days.

(21) Appl. No.: 12/723,686

(22) Filed: Mar. 15, 2010

(65) Prior Publication Data

US 2010/0237276 A1 Sep. 23, 2010

Related U.S. Application Data

(60) Provisional application No. 61/161,408, filed on Mar. 19, 2009.

(51) Int. Cl.
*H01M 4/88* (2006.01)

(52) U.S. Cl. ........... 252/182.1; 252/506; 252/519.12; 252/519.4; 252/520.21; 428/403; 429/188; 429/218.1; 429/221; 429/217; 429/231.5; 429/231.8; 429/232; 429/306; 429/326; 429/330

(58) Field of Classification Search ............... 252/182.1, 252/506, 519.12, 519.4, 520.21; 429/188, 429/221, 217, 231.5, 231.8, 231.9, 218.1, 429/232, 306, 326, 330; 428/403
See application file for complete search history.

(56) References Cited

U.S. PATENT DOCUMENTS

| | | | |
|---|---|---|---|
| 6,815,122 B2 * | 11/2004 | Barker et al. | 429/231.9 |
| 7,781,100 B2 * | 8/2010 | Liu et al. | 429/218.1 |
| 2004/0018428 A1 * | 1/2004 | Cochran et al. | 429/217 |
| 2004/0157126 A1 * | 8/2004 | Belharouak et al. | 429/231.8 |
| 2008/0280141 A1 * | 11/2008 | Dobbs et al. | 428/403 |
| 2009/0023069 A1 * | 1/2009 | Tian et al. | 429/231.5 |
| 2009/0029249 A1 * | 1/2009 | Takami et al. | 429/188 |

* cited by examiner

*Primary Examiner* — Khanh Tuan Nguyen
(74) *Attorney, Agent, or Firm* — Kirton McConkie; Evan R. Witt

(57) ABSTRACT

A composition including a first material and a metal or a metal oxide component for use in an electrochemical redox reaction is described. The first material is represented by a general formula $M^1_x M^2_y XO_4$, wherein $M^1$ represents an alkali metal element; $M^2$ represents an transition metal element; X represents phosphorus; O represents oxygen; x is from 0.6 to 1.4; and y is from 0.6 to 1.4. Further, the metal or the metal oxide component includes at least two materials selected from the group consisting of transition metal elements, semimetal elements, group IIA elements, group IIIA elements, group IVA elements, alloys thereof and oxides of the above metal elements and alloys, wherein the two materials include different metal elements. Moreover, the first material and the metal or the metal oxide component are co-crystallized or physically combined, and the metal or the metal oxide component takes less than about 30% of the composition.

19 Claims, 4 Drawing Sheets

ELECTROCHEMICAL COMPOSITION AND ASSOCIATED TECHNOLOGY

CROSS-REFERENCE TO RELATED APPLICATION

This application claims the priority benefit of U.S. provisional application Ser. No. 61/161,408, filed on Mar. 19, 2009. The entirety of the above-mentioned patent application is hereby incorporated by reference herein and made a part of specification.

BACKGROUND OF THE INVENTION

1. Field of Invention

The present invention relates to a composition for use in an electrochemical redox reaction and a battery including the same.

2. Description of Related Art

Many electrochemical applications and devices, such as electrochemical cells or batteries, employ compositions that demonstrate electrochemical redox activity and/or are capable of participating in electro-chemical redox reactions.

A rechargeable lithium battery is generally used as a source for the power supply in the conventional art and has drawn attention in the industry. A lithium battery typically has a lithium ion electrolyte, a solid reductant as an anode and a solid oxidant as a cathode. It is observed that various solid compositions of the cathode material affect the conductivity and the capacity of the lithium battery.

Accordingly, development of a composition suitable for use in an electrochemical redox reaction and serving as a cathode material of a battery is generally desirable.

SUMMARY OF THE INVENTION

The present invention provides a composition serving as a cathode material of a battery. The formed battery including the composition of the present invention has a better performance in terms of physical and electric properties than the conventional battery.

The present invention provides a composition for use in an electrochemical redox reaction. The composition includes a first material and a metal or a metal oxide component. The first material is represented by a general formula $M^1_x M^2_y XO_4$, wherein $M^1$ represents at least one element selected from alkali metal elements, beryllium, magnesium, cadmium, boron, and aluminum; $M^2$ represents at least one element selected from transition metal elements, zinc, cadmium, beryllium, magnesium, calcium, strontium, boron, aluminum, silicon, gallium, germanium, indium, tin, antimony, and bismuth; X represents at least one element selected from phosphorus, arsenic, silicon and sulfur; O represents oxygen; x represents a number from about 0.6 to about 1.4 inclusive; and y represents a number from about 0.6 to about 1.4 inclusive. Further, the metal or the metal oxide component includes at least two materials selected from the group consisting of transition metal elements, semimetal elements, group IIA elements, group IIA elements, group IVA elements, alloys thereof and oxides of the above metal elements and the alloys, wherein the at least two materials include different metal elements. In addition, the first material and the metal or the metal oxide component are co-crystallized or physically combined, and the metal or the metal oxide component takes less than about 30% of the composition.

In the present invention, at least two materials selected from the group consisting of transition metal elements, semimetal elements, group IIA elements, group IIIA elements, group IVA elements, alloys thereof and oxides of the above metal elements and the alloys are added to the conventional composition, and the mixture is heated to form a crystalline form, so as to effectively enhance the conductivity and capacity of the battery. Therefore, the performance of the battery including the composition of the present invention is enhanced, and the competitive advantage is achieved.

In order to make the aforementioned and other objects, features and advantages of the present invention comprehensible, a preferred embodiment accompanied with figures is described in detail below.

BRIEF DESCRIPTION OF THE DRAWINGS

Table 1 shows the comparison in physical properties between the compositions of the present invention (Examples 1-6) and the conventional compositions (Comparative Examples 1-2).

Table 2 shows the comparison in electric properties between the batteries respectively including the compositions of the present invention (Examples 1-6) and the batteries respectively including the conventional compositions (Comparative Examples 1-2).

DESCRIPTION OF EMBODIMENTS

Figure 1:
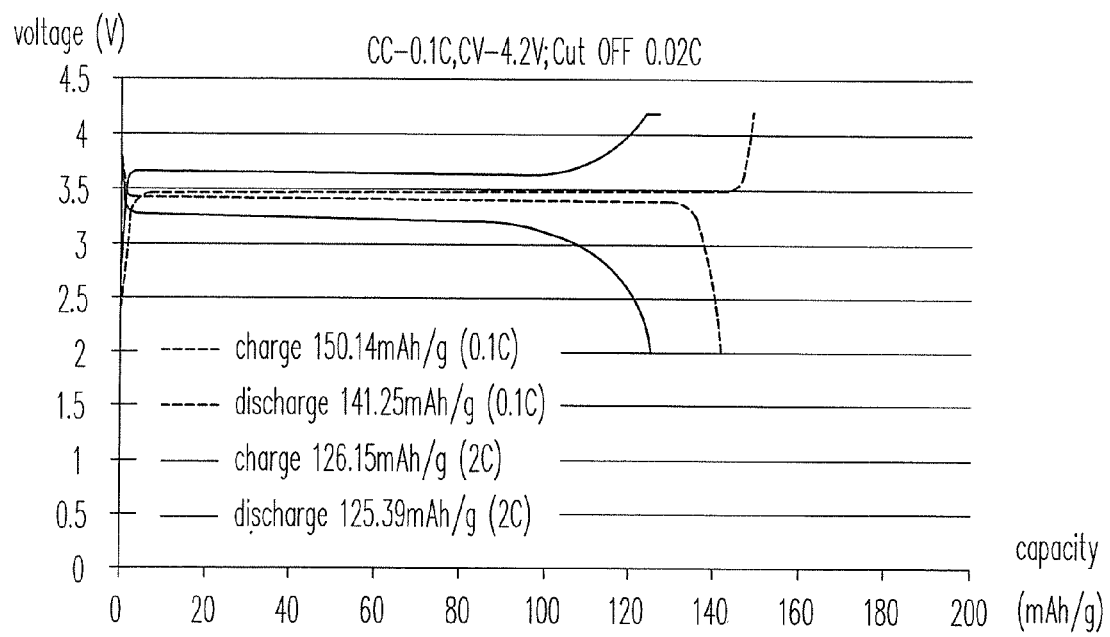
FIG. 1 illustrates a charging/discharging diagram of a battery including $Li_x Fe_y PO_4 \cdot z(V_2O_3/MoO_2)/C$ of the present invention as a cathode material.

A composition for use in an electrochemical redox reaction is described. The composition includes a first material and the first material is represented by a general formula (I):

$$M^1_x M^2_y XO_4 \qquad (I)$$

In the formula (I), $M^1$ represents at least one element selected from alkali metal elements, beryllium, magnesium, cadmium, boron, and aluminum. Generally, the term "alkali metal element" refers to any of the metals in group IA of the periodic table, namely, lithium, sodium, potassium, rubidium, cesium and francium. In an embodiment, $M^1$ represents an alkali metal element such as lithium, sodium, or potassium, for example. An example of a suitable alkali metal element is lithium. The following embodiments in which $M^1$ represents lithium and the composition serves as a cathode material for a lithium battery is provided for illustration purposes, and is not construed as limiting the present invention.

In the formula (I), $M^2$ represents at least one element selected from transition metal elements, zinc, cadmium, beryllium, magnesium, calcium, strontium, boron, aluminum, silicon, gallium, germanium, indium, tin, antimony, and bismuth. Generally, the term "transition metal element" refers to any of the elements 21 to 29 (the first row transition metal elements from scandium to copper), 39 to 47 (the second row transition metal elements from yttrium to silver) and 57 to 79 (the third row transition metal elements from lanthanum to gold). In an embodiment, $M^2$ represents a first row transition metal element, for example. An example of a suitable first row transition metal element is iron.

In the formula (I), X represents at least one element selected from phosphorus, arsenic, silicon and sulfur. In an embodiment, X represents phosphorus or arsenic, for example. Further, O represents oxygen.

In the formula (I), x represents a number from about 0.6 to about 1.4 inclusive ($0.6 \leq x \leq 1.4$). In an embodiment, x represents a number from about 0.8 to about 1.2 inclusive ($0.8 \leq x \leq 1.2$), for example. In another embodiment, x represents a number from about 0.9 to about 1.1 inclusive ($0.9 \leq x \leq 1.1$), for example.

In the formula (I), y represents a number from about 0.6 to about 1.4 inclusive ($0.6 \leq y \leq 1.4$). In an embodiment, y represents a number from about 0.8 to about 1.2 inclusive ($0.8 \leq y \leq 1.2$), for example. In another embodiment, y represents a number from about 0.9 to about 1.1 inclusive ($0.9 \leq y \leq 1.1$), for example.

The composition for use in the electrochemical redox reaction further includes a metal or a metal oxide component. The metal or the metal oxide component includes at least two materials selected from the group consisting of transition metal elements, semimetal elements, group IIA elements, group IIIA elements, group IVA elements, alloys thereof and oxides of the above metal elements and the alloys, wherein the at least two materials include different metal elements. Generally, the term "semimetal element" refers to any of the element with a small overlap in the energy of the conduction band and valence bands, such as arsenic, antimony and bismuth. The term "group IIA element" refers to beryllium, magnesium, calcium, strontium, barium or radium. The term "group IIIA element" refers to boron, aluminum, gallium, indium or thallium. The term "group IVA element" refers to carbon, silicon, germanium, tin or lead.

In an embodiment, the metal or the metal oxide component includes two materials A and B in a combined form (represented by A/B), and A and B are respectively selected from the group consisting of transition metal elements, semimetal elements, group IIA elements, group IIIA elements, group IVA elements, alloys thereof and oxides of the above metal elements and the alloys, for example. In other words, A/B includes $M^3{}_aO_b/M^4{}_cO_d$, $M^3{}_aO_b/M^4$, $M^3/M^4$, $M^5{}_eM^6{}_fO_g/M^5{}_hM^7{}_iO_j$, $M^5{}_eM^6{}_fO_g/M^5$, $M^5{}_eM^6{}_fO_g/M^5M^7$ or $M^5M^6/M^5M^7$, wherein $M^3$, $M^4$, $M^5$, $M^6$ and $M^7$ are different from each other, and a, b, c, d, e, f, g, h, i and j are integers. $M^3$, $M^4$, $M^5$, $M^6$ and $M^7$ are respectively selected from the group consisting of transition metal elements, semimetal elements, group IIA elements, group IIIA elements, group IVA elements and alloys thereof. Preferably, $M^3$, $M^4$, $M^5$, $M^6$ and $M^7$ are respectively selected from the group consisting of first row transition metal elements, second row transition metal elements, group IIA elements, group IIIA elements and group IVA elements, for example. More $M^3$, $M^4$, $M^5$, $M^6$ and $M^7$ each represent cobalt, molybdenum, titanium, aluminum, manganese, magnesium, tin, bismuth, zinc or vanadium, for example.

The present invention is illustrated with the embodiment in which the metal or the metal oxide component includes two materials selected from the group consisting of transition metal elements, semimetal elements, group IIA elements, group IIIA elements, group IVA elements, alloys thereof and oxides of the above metal elements and the alloys, but is not limited thereto. It is appreciated by persons skilled in the art that the metal or the metal oxide component can include more than two materials selected from the group consisting of transition metal elements, semimetal elements, group IIA elements, group IIIA elements, group IVA elements, alloys thereof and oxides of the above metal elements and the alloys.

In the present invention, the composition for use in the electrochemical redox reaction includes a first material and a metal or a metal oxide component. The first material and the metal or the metal oxide component are co-crystallized (symbolized as "•") or physically combined (symbolized as "/"). Further, the metal or the metal oxide component takes less than about 30% of the composition. The specific surface area of the composition is less than about 30 $m^2/g$. The conductivity of the composition is greater than about $10^{-8}$ S/cm. The primary and second particle sizes of the composition are respectively smaller than about 65 μm.

The composition of the present invention can further include carbon. The coating of the carbon on the surface of the composition is for enhancing the conductivity. The source of the carbon is selected from the group consisting of polymers containing a carbon skeleton, oligomers containing a carbon skeleton, carbohydrates, aromatic hydrocarbons, natural graphite, artificial graphite, carbon black, acetylene black, cokes and petroleum cokes. Particularly, the precursor of the carbon is selected from the group consisting of polyethylene, polypropylene, glucose, fructose, sucrose, xylose, sorbose, starch, cellulose, block polymers of ethylene and ethylene oxide, polymers of furfuryl alcohol and sacrificial carbon. The particle size of the carbon is preferably less than about 15 micrometers.

Several synthesis examples and comparative examples are described in the following.

EXAMPLE 1

12,000 g of water, 5,740 g of phosphoric acid and 2,740 g of iron powder ($M^2$=Fe) were sequentially added to a reaction tank and stirred for 15-30 hours. Thereafter, 35 g of $V_2O_3$ (serving as A) was added and the mixture was stirred for 4-8 hours. Afterwards, 3600 g of fructose and deionized water in total were added to the mixture. Further, after the reactant slurry was milled by a miller for 1-3 hours, 2100 g of $LiOH \cdot H_2O$ ($M^1$=Li) was added. Further, $MoO_2$ (serving as B) was added so that Li, Fe, P, $V_2O_3$, $MoO_2$ were in a molar ratio of 1.02:1:1.01:0.0075:0.0075. After the precursor slurry was completed, a spray dried process was performed to obtain precursor dry powder. The precursor dry powder was put in a aluminum oxide crucible and then a heating treatment was performed thereto in a high temperature furnace, where the temperature was heated up to 500-900° C. in a heating rate of 7-18° C./min, and the temperature was maintained at 500-900° C. under inert atmosphere for 5-10 hours. In the furnace, carbon powder was suspended in an inert carrier gas and mixed with the precursor dry powder to produce a composition of $Li_xFe_yPO_4 \cdot z(V_2O_3/MoO_2)/C$ in a crystalline form, wherein x, y and z were 1.060, 0.992 and 0.075 respectively, and the numbers of x, y and z were determined with element analysis using ICP (inductively coupled plasma).

EXAMPLE 2

A composition was prepared in accordance with the same procedure as in Example 1, except that $MoO_2$ of Example 1 was replaced by tin. The composition of $Li_xFe_yPO_4 \cdot z(V_2O_3/Sn)/C$ was thus obtained, wherein x, y and z were 1.002, 0.976 and 0.075 respectively.

EXAMPLE 3

A composition was prepared in accordance with the same procedure as in Example 1, except that $MoO_2$ of Example 1 was replaced by $TiO_2$. The composition of $Li_xFe_yPO_4 \cdot z(V_2O_3/TiO_2)/C$ was thus obtained, wherein x, y and z were 1.002, 0.978 and 0.075 respectively.

EXAMPLE 4

A composition was prepared in accordance with the same procedure as in Example 1, except that $MoO_2$ of Example 1 was replaced by $Al_2O_3$. The composition of $Li_xFe_yPO_4 \cdot z(V_2O_3/Al_2O_3)/C$ was thus obtained, wherein x, y and z were 1.003, 0.981 and 0.075 respectively.

EXAMPLE 5

A composition was prepared in accordance with the same procedure as in Example 1, except that $MoO_2$ of Example 1 was replaced by MgO. The composition of $Li_xFe_yPO_4 \cdot z(V_2O_3/MgO)/C$ was thus obtained, wherein x, y and z were 1.058, 0.976 and 0.075 respectively.

EXAMPLE 6

A composition was prepared in accordance with the same procedure as in Example 1, except that $MoO_2$ of Example 1 was replaced by $Co_3O_4$. The composition of $Li_xFe_yPO_4 \cdot z(V_2O_3/Co_3O_4)/C$ was thus obtained, wherein x, y and z were 1.079, 0.973 and 0.075 respectively.

COMPARATIVE EXAMPLE 1

A composition was prepared in accordance with the same procedure as in Example 1, except that $V_2O_3$ and $MoO_2$ of Example 1 were not used. The composition of $Li_xFe_yPO_4/C$ was thus obtained, wherein x and y were 1.136 and 0.921 respectively.

COMPARATIVE EXAMPLE 2

A composition was prepared in accordance with the same procedure as in Example 1, except that $MoO_2$ of Example 1 was not used. The composition of $Li_xFe_yPO_4 \cdot zV_2O_3/C$ was thus obtained, wherein x, y and z were 1.017, 0.990 and 0.075 respectively.

The physical properties of the compositions of Examples 1-6 and Comparative Examples 1-2 are shown in Table 1.

TABLE 1

| Composition | A | B | Tab density Dt $(g/cm^3)$ | Particle size $D_{50}$ (um) | Particle size $D_{95}$ (um) | Surface area $(m^2/g)$ | x | y | z |
|---|---|---|---|---|---|---|---|---|---|
| Example 1 | $V_2O_3$ | $MoO_2$ | 0.62 | 27.79 | 63.90 | 19.82 | 1.060 | 0.992 | 0.075 |
| Example 2 | $V_2O_3$ | Sn | 0.63 | 25.04 | 58.13 | 17.02 | 1.002 | 0.976 | 0.075 |
| Example 3 | $V_2O_3$ | $TiO_2$ | 0.61 | 24.45 | 56.62 | 21.10 | 1.002 | 0.978 | 0.075 |
| Example 4 | $V_2O_3$ | $Al_2O_3$ | 0.60 | 28.05 | 62.43 | 16.57 | 1.003 | 0.981 | 0.075 |
| Example 5 | $V_2O_3$ | MgO | 0.54 | 18.52 | 55.97 | 20.14 | 1.058 | 0.976 | 0.075 |
| Example 6 | $V_2O_3$ | $Co_3O_4$ | 0.53 | 18.95 | 59.18 | 18.43 | 1.079 | 0.973 | 0.075 |
| Comparative Example 1 | Not used | Not used | 0.45 | 13.01 | 27.90 | 16.05 | 1.136 | 0.921 | — |
| Comparative Example 2 | $V_2O_3$ | Not used | 0.40 | 0.38 | 2.09 | 19.40 | 1.017 | 0.990 | 0.075 |

The particle size $D_{50}$ of the composition is acceptable in the range of 0.2-30 um, and the particle size $D_{95}$ of the same is acceptable in the range of 1-65 um. In addition, the BET surface area of the composition is acceptable in the range of 5-25 $m^2/g$. As shown in Table 1, the compositions of Examples 1-6 and Comparative Examples 1-2 are within the acceptable range in terms of $D_{50}$, $D_{95}$ and BET surface area. It is noted that the tab density Dt of each of Examples 1-6 is higher than that of Comparative Example 1 or 2. When the composition is used as a cathode material of a lithium battery, the capacity of the lithium battery is higher as the tab density is increased. Thus, each of the compositions of Examples 1-6 is better than the conventional compositions of Comparative Examples 1-2 as a cathode material of the lithium battery.

Each of the compositions of Examples 1-6 and Comparative Examples 1-2 is applied to form the cathode of a lithium battery and the formed lithium battery is subjected to an electrochemistry test. In details, the lithium batteries respectively including the compositions of Examples 1-6 and Comparative Examples 1-2 are charged and discharged at a rate of 0.1C in the first cycle and then discharged and discharged at a rate of 2C in the second cycle to determine the capacity. The testing is performed under the condition of CC (charge current)=0.1C, CV (charge voltage)=4.2 V and Cut OFF Current=0.02 C.

TABLE 2

| Cathode material of lithium battery | | | Capacity (mAh/g) | | | |
|---|---|---|---|---|---|---|
| | | | 0.1 C | 0.1 C | 2 C | 2 C |
| Composition | A | B | charge | discharge | charge | discharge |
| Example 1 | $V_2O_3$ | $MoO_2$ | 150 | 141 | 126 | 125 |
| Example 2 | $V_2O_3$ | Sn | 164 | 148 | 142 | 141 |

TABLE 2-continued

| Cathode material of lithium battery | | Capacity (mAh/g) | | | |
|---|---|---|---|---|---|
| Composition | A | B | 0.1 C charge | 0.1 C discharge | 2 C charge | 2 C discharge |
| Example 3 | $V_2O_3$ | $TiO_2$ | 169 | 151 | 130 | 129 |
| Example 4 | $V_2O_3$ | $Al_2O_3$ | 152 | 132 | 352 | 104 |
| Example 5 | $V_2O_3$ | MgO | 160 | 154 | 103 | 99 |
| Example 6 | $V_2O_3$ | $Co_3O_4$ | 166 | 134 | 120 | 118 |
| Comparative Example 1 | Not used | Not used | 159 | 155 | 111 | 113 |
| Comparative Example 2 | $V_2O_3$ | Not used | 164 | 155 | 126 | 125 |

Figure 2:
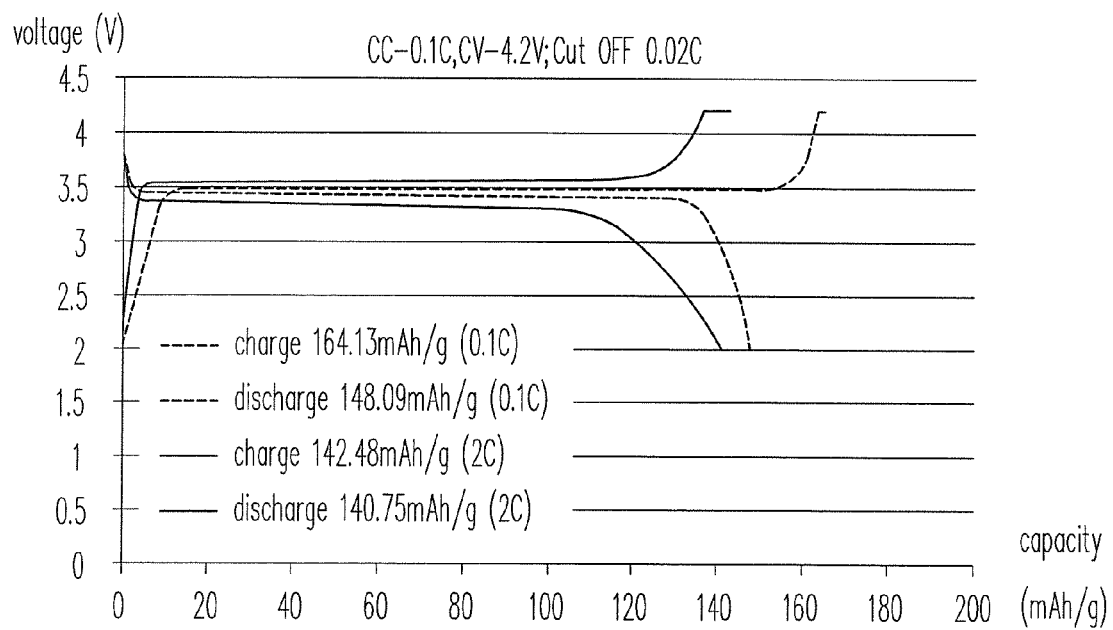
FIG. 2 illustrates a charging/discharging diagram of a battery including $Li_x Fe_y PO_4 \cdot z(V_2O_3/Sn)/C$ of the present invention as a cathode material.
Figure 3:
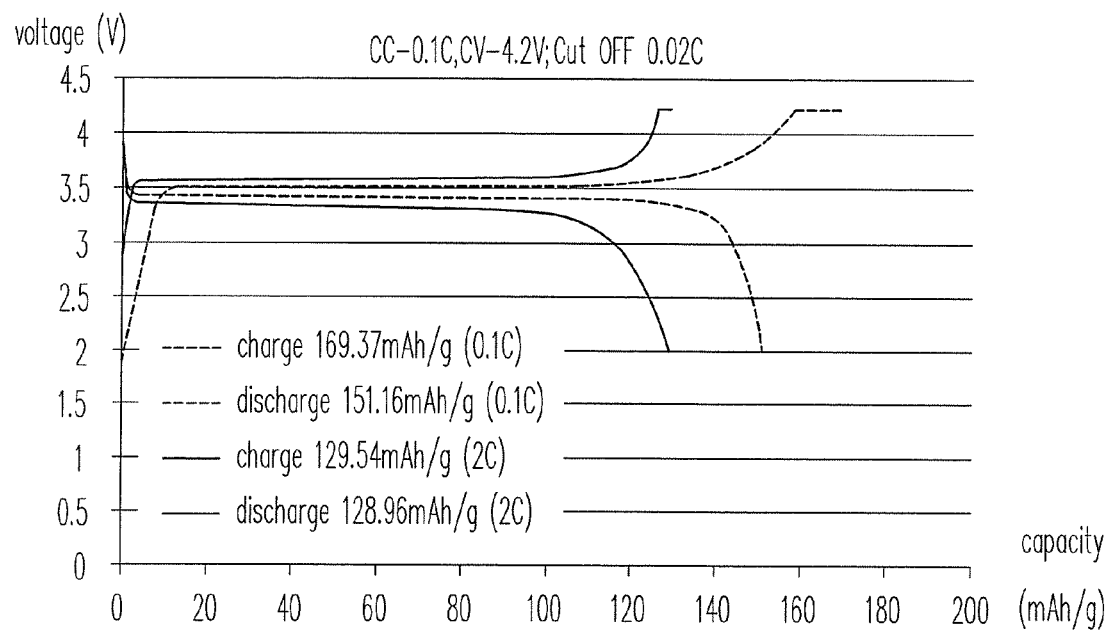
FIG. 3 illustrates a charging/discharging diagram of a battery including $Li_x Fe_y PO_4 \cdot z(V_2O_3/TiO_2)/C$ of the present invention as a cathode material.
Figure 4:
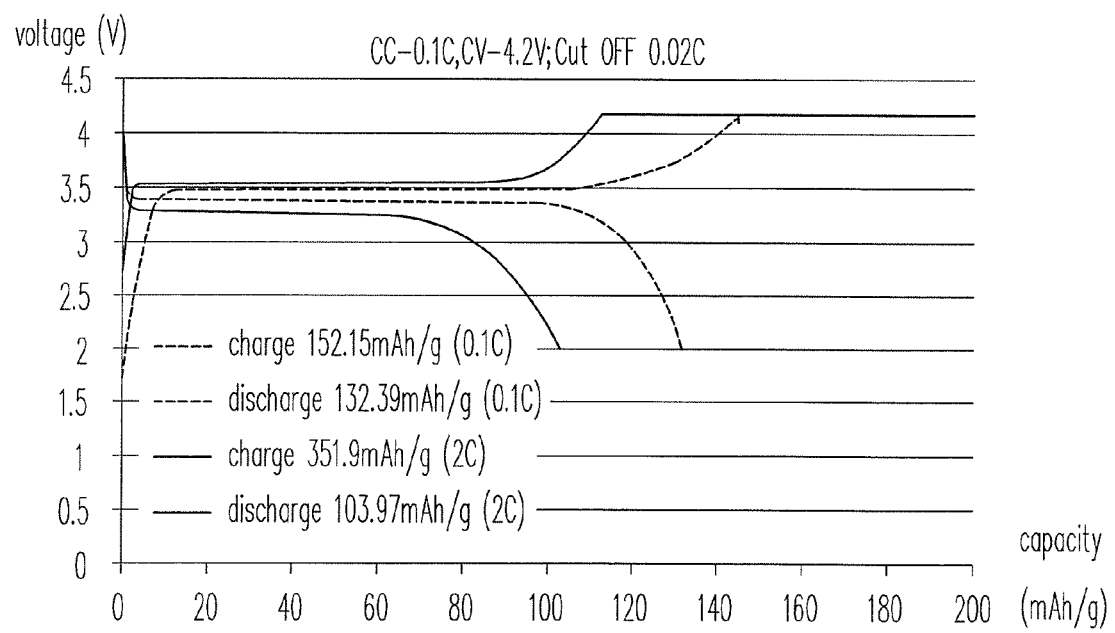
FIG. 4 illustrates a charging/discharging diagram of a battery including $Li_x Fe_y PO_4 \cdot z(V_2O_3/Al_2O_3)/C$ of the present invention as a cathode material.
Figure 5:
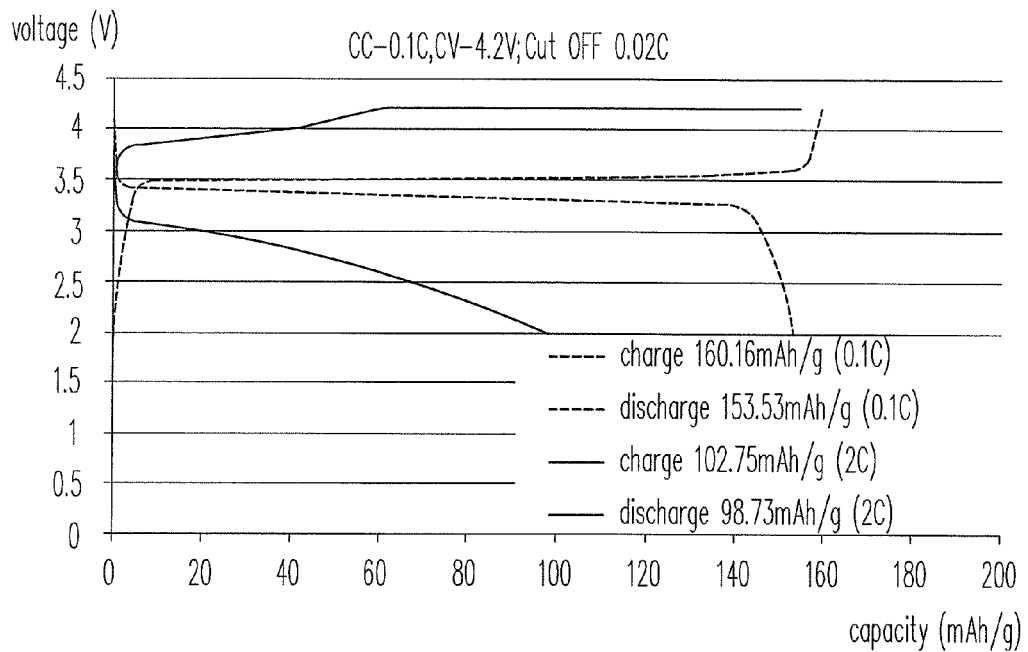
FIG. 5 illustrates a charging/discharging diagram of a battery including $Li_x Fe_y PO_4 \cdot z(V_2O_3/MgO)/C$ of the present invention as a cathode material.
Figure 6:
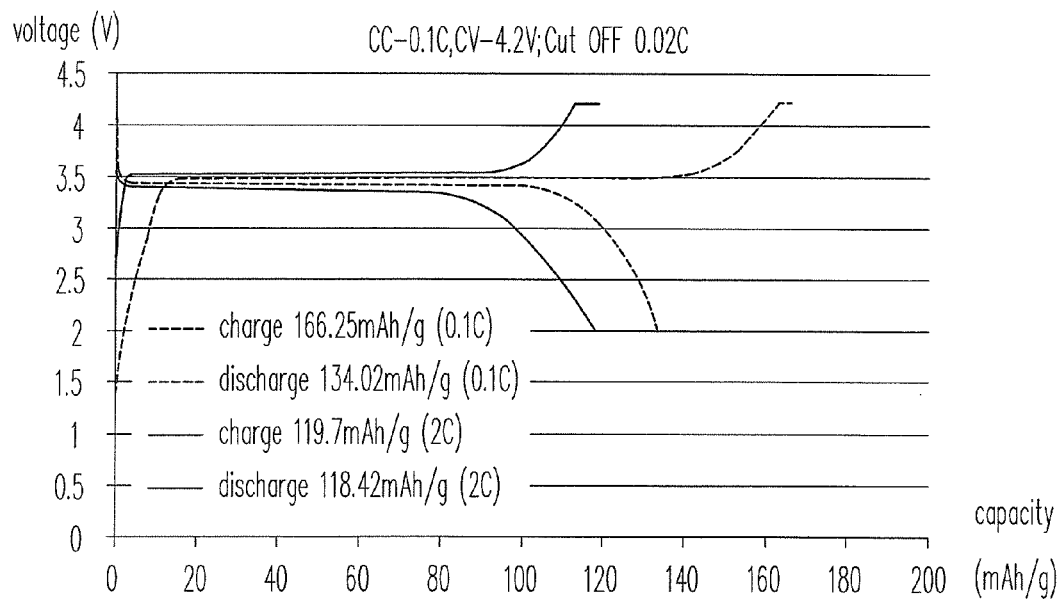
FIG. 6 illustrates a charging/discharging diagram of a battery including $Li_x Fe_y PO_4 \cdot z(V_2O_3/Co_3O_4)/C$ of the present invention as a cathode material.
Figure 7:
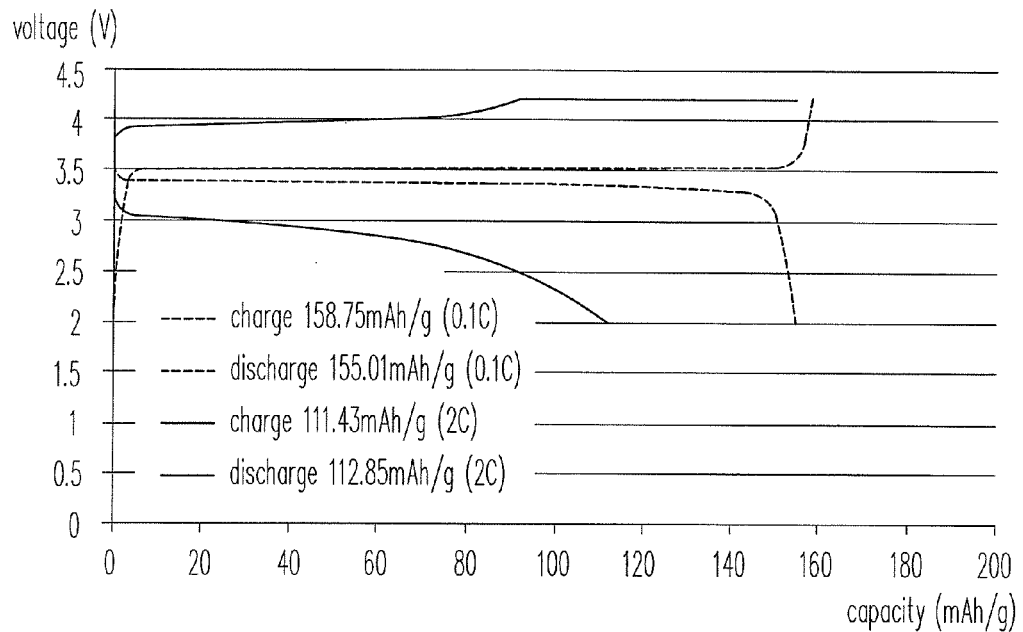
FIG. 7 illustrates a charging/discharging diagram of a conventional battery including $Li_x Fe_y PO_4/C$ as a cathode material.
Figure 8:
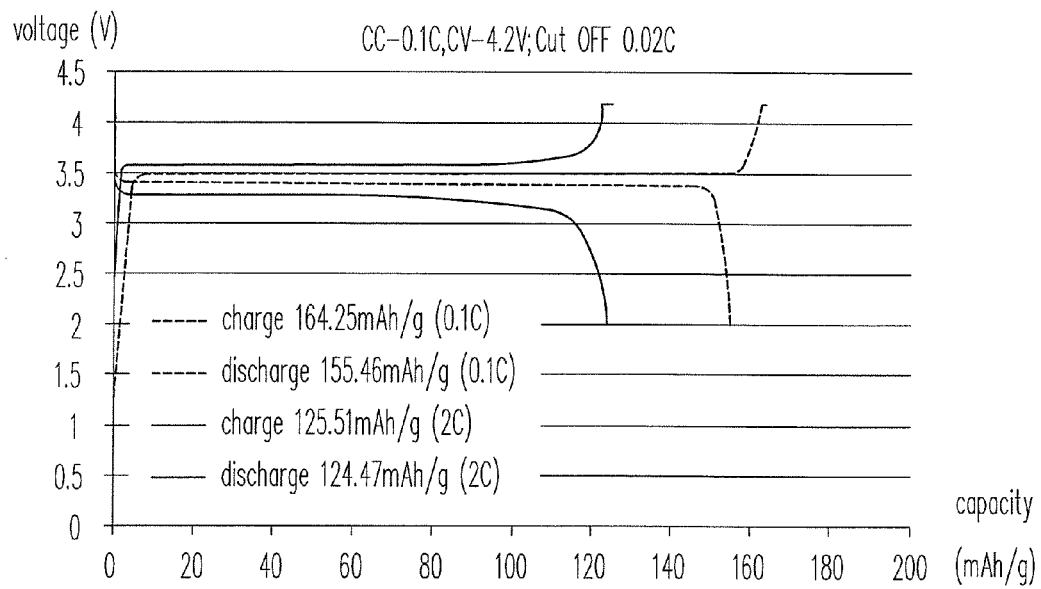
FIG. 8 illustrates a charging/discharging diagram of a conventional battery including $Li_x Fe_y PO_4 \cdot zV_2O_3/C$ as a cathode material.

As shown in Table 2, the capacity of the lithium battery including LiFePO$_4$.z(V$_2$O$_3$/Sn)}/C of Example 2 as a cathode material is 141 mAh/g at the discharged rate of 2C (as shown in FIG. 2), which is much higher than that of the conventional lithium battery including LiFePO$_4$/C of Comparative Example 1 (113 mAh/g, as shown in FIG. 7) or LiFePO$_4$.zV$_2$O$_3$/C of Comparative Example 2 (125 mAh/g, as shown in FIG. 8) at the same discharged rate of 2C. Further, the capacity of the lithium battery including LiFePO$_4$.z(V$_2$O$_3$/TiO$_2$)}/C of Example 3 (129 mAh/g, as shown in FIG. 3) is also higher than that of the conventional lithium batteries at the discharged rate of 2C. That is to say, the lithium battery including the composition of the present invention can be implicated as a better power type battery for an electric vehicle, power tools, UPS and etc.

The above mentioned examples and embodiments in which the composition of the present invention is applied to form the cathode of the lithium battery is provided for illustration purposes, and is not construed as limiting the present invention. It is appreciated by persons skilled in the art that the composition of the present invention can be used as a cathode material of other types of batteries.

In summary, at least two materials selected from the group consisting of transition metal elements, semimetal elements, Group IIA elements, Group IIIA elements, Group IVA elements, alloys thereof and oxides of the above metal elements and the alloys are added to the conventional cathode material such as Li$_x$Fe$_y$PO$_4$/C, and the mixture is heated to form a crystalline form, so as to effectively enhance the conductivity and capacity of the lithium battery.

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:

1. A composition for use in an electrochemical redox reaction, comprising:
   a first material, represented by a general formula M$^1_x$M$^2_y$XO$_4$, wherein
      M$^1$ represents at least one element selected from alkali metal elements, beryllium, magnesium, cadmium, boron, and aluminum;
      M$^2$ represents at least one element selected from transition metal elements, zinc, cadmium, beryllium, magnesium, calcium, strontium, boron, aluminum, silicon, gallium, germanium, indium, tin, antimony, and bismuth;
      X represents at least one element selected from phosphorus, arsenic, silicon and sulfur;
      O represents oxygen;
      x represents a number from about 0.6 to about 1.4 inclusive; and
      y represents a number from about 0.6 to about 1.4 inclusive; and
   a metal or a metal oxide component, comprising at least two materials selected from the group consisting of transition metal elements, semimetal elements, Group IIA elements, group IIIA elements, group IVA elements, alloys thereof and oxides of the above metal elements and the alloys, wherein the at least two materials comprise different metal elements and exclude lithium, and one of the at least two materials is selected from the group consisting of transition metal elements, semimetal elements, Group IIA elements, Group IIIA elements, Group IVA elements and alloys thereof,
   wherein the first material and the metal or the metal oxide component are co-crystallized or physically combined, and the metal or the metal oxide component takes less than about 30% of the composition.

2. The composition of claim 1, wherein the metal or the metal oxide component is represented by M$^3_a$O$_b$/M$^4$, M$^3$/M$^4$, M$^5_e$M$^6_f$O$_g$/M$^5$, M$^5_e$M$^6_f$O$_g$/M$^5$M$^7$ or M$^5$M$^6$/M$^5$M$^7$, M$^3$, M$^4$, M$^5$, M$^6$ and M$^7$ are different from each other, and a, b, c, d, e, f, g, h, i and j are integers.

3. The composition of claim 2, wherein M$^3$, M$^4$, M$^5$, M$^6$ and M$^7$ each represent cobalt, molybdenum, titanium, aluminum, manganese, magnesium, tin, bismuth, zinc or vanadium.

4. The composition of claim 1, wherein M$^1$ represents lithium, sodium or potassium.

5. The composition of claim 1, wherein M$^2$ represents a first row transition metal element.

6. The composition of claim 1, wherein X represents phosphorus or arsenic.

7. The composition of claim 1, further comprising carbon coated on a surface of the composition, wherein a source of the carbon is selected from the group consisting of polymers containing a carbon skeleton, oligomers containing a carbon skeleton, carbohydrates, aromatic hydrocarbons, natural graphite, artificial graphite, carbon black, acetylene black, cokes and petroleum cokes.

8. The composition of claim 1, wherein a specific surface area of the composition is less than about 30 m$^2$/g.

9. The composition of claim 1, wherein a conductivity of the composition is greater than about 10$^{-8}$ S/cm.

10. The composition of claim 1, wherein primary and second ond particle sizes of the composition are respectively smaller than about 65 μm.

11. A battery comprising a composition as a cathode material, wherein the composition comprises:
   a first material, represented by a general formula M$^1_x$M$^2_y$XO$_4$, wherein
      M$^1$ represents at least one element selected from alkali metal elements, beryllium, magnesium, cadmium, boron, and aluminum;
      M$^2$ represents at least one element selected from transition metal elements, zinc, cadmium, beryllium, magnesium, calcium, strontium, boron, aluminum, silicon, gallium, germanium, indium, tin, antimony, and bismuth;
      X represents at least one element selected from phosphorus, arsenic, silicon and sulfur;
      O represents oxygen;
      x represents a number from about 0.6 to about 1.4 inclusive; and
      y represents a number from about 0.6 to about 1.4 inclusive; and a metal or a metal oxide component, comprising at least two materials selected from the group consisting of transition metal elements, semimetal elements, group IIA elements, group IIIA elements, group IVA elements, alloys thereof and oxides of the above metal elements and the alloys, wherein the at least two materials comprise different metal elements and exclude lithium, and one of the at least two materials is selected from the group consisting of transition metal elements, semimetal elements, Group IIA elements, Group IIIA elements, Group IVA elements and alloys thereof, wherein the first material and the metal or the metal oxide component are co-crystallized or physically combined, and the metal or the metal oxide component takes less than about 30% of the composition.

12. The battery of claim 11, wherein the metal or the metal oxide component is represented by $M^3{}_aO_b/M^4$, $M^3/M^4$, $M^5{}_eM^6{}_fO_g/M^5$, $M^5{}_eM^6{}_fO_{g/M}{}^5M^7$ or $M^5M^6/M^5M^7$, $M^3$, $M^4$, $M^5$, $M^6$ and $M^7$ are different from each other, and a, b, c, d, e, f, g, h, i and j are integers.

13. The composition of claim 12, wherein $M^3$, $M^4$, $M^5$, $M^6$ and $M^7$ each represent cobalt, molybdenum, titanium, aluminum, manganese, magnesium, tin, bismuth, zinc or vanadium.

14. The battery of claim 11, wherein $M^1$ represents lithium, sodium or potassium.

15. The battery of claim 11, wherein $M^2$ represents a first row transition metal element.

16. The battery of claim 11, wherein X represents phosphorus or arsenic.

17. The battery of claim 11, wherein a specific surface area of the composition is less than about 30 m²/g.

18. The battery of claim 11, wherein a conductivity of the composition is greater than about $10^{-8}$ S/cm.

19. The battery of claim 11, wherein primary and second particle sizes of the composition are respectively smaller than about 65 μm.

* * * * *